Patented Apr. 7, 1931

1,799,176

UNITED STATES PATENT OFFICE

ZDENKO METZL, OF PARIS, FRANCE, ASSIGNOR TO SOCIETE ANONYME: SELBI, SOCIETE D'EXPLOITATION DE LICENCES DE BREVETS INDUSTRIELS, OF GENEVA, SWITZERLAND, A CORPORATION OF SWITZERLAND

MANUFACTURE OF FERTILIZER FROM RESIDUES OF DISTILLERIES AND SUGAR FACTORIES

No Drawing. Application filed August 6, 1927, Serial No. 211,258, and in France October 16, 1926.

In the French Patent No. 459872, a description is given of a process for treating the residue from distilleries or sugar factories, according to which the concentrated residue are mixed with phosphoric acid, acid phosphates or a substance, such as superphosphate, containing it the mixture being heated.

In the description of that process it is stated that the reaction commences at ordinary water bath temperature and is complete at a slightly higher temperature. The most suitable proportions to take for the said reaction are given as three parts of superphosphate, sufficiently rich in phosphoric acid (about 20 per cent), to two parts of residue (specific gravity 1.38). It is also stated that, in order to obtain the said reaction, care should be taken to add a sufficient amount of superphosphate. As a guide, the figures of a laboratory experiment were given, in which the quantities taken were two parts of ocean superphosphate to one part of concentrated residue.

It was also stated that the reaction between the superphosphate and the residue requires a continuous application of heat, and that the most suitable temperature is about 100° centigrade.

To this process however, which furnishes a dry and non-hygroscopic fertilizer, there is the serious objection of having to use excessively large quantities of superphosphate, fairly rich in phosphoric acid (thus locking up a considerable capital), and of furnishing a product which, on the one hand, is rather poor in nitrogen (the most important fertilizing constituent of the residue), and on the other hand, too rich in phosphoric acid for the average requirements of plants. Moreover, the direct mixing of the concentrated residue with superphosphate is a very difficult operation, owing to the formation in all cases, of bulky lumps which adhere to the walls of the apparatus impeding the stirring. For this reason, it is necessary to use a considerable excess of dry materials (of the superphosphate type) and that, in order to obtain completely the effects of the chemical reaction, a very long time is needed and a sufficiently high temperature (entailing an excessive consumption of coal) to effect the reduction of the lumps formed and bring into intimate contact the particles of the two substances subjected to the reaction.

The improvement forming the subject of the present invention entirely obviates the objections above referred to.

The phosphoric acid in the superphosphate (material in which it is present in the most easily dissociated condition) enables the alkali salts of the organic acids to be decomposed at very low temperatures (between 50° and 60° centigrade), under certain conditions, by transforming them into double phosphates of lime. At the same time, betain (the hygroscopic base) forms with phosphoric acid the (non-hygroscopic) phosphate of betain; and, on the other hand, the phosphates of lime in the superphosphate combine with the glycerine, forming glycerophosphates of lime, which are non-hygroscopic.

In order to ensure the most suitable conditions needed for carrying out these reactions, I have found that the process must be conducted in two quite distinct stages.

In the first stage, the process is started by decomposing the alkali salts of the organic acids by the phosphoric acid of the superphosphate, and forming combinations of betain and glycerine with the phosphoric acid, in a heated mixture the temperature of which fluctuates between 60° and 70° centigrade. It is advisable to employ the distillery or similar residues in a fairly fluid condition, which is attained by heating the said residue to a fairly high temperature, for example and preferably, to about 90° centigrade. Before being brought into contact with the super phosphate, the residue should be intimately mixed with a distributing carrier, preferably rather fine sawdust, or any other suitable absorbent such as dried peat, or the like, in a steam-heated mixer. The amount of distributing carrier used may vary, but very good results are obtained with a proportion of 25 per cent, or one-fourth, of the weight of residue taken. As soon as a good mixture has been obtained, the necessary amount of superphosphate is introduced into the mixer. To prevent lowering the temperature in the mixer, which would prolong the operation, it is advisable to preheat the superphosphate to about 50° centigrade. By operating in this manner, the amount of superphosphate of even the lowest grade (with 14 per cent of phosphoric acid) never exceeds the weight of the residue taken. During this operation, the transformation of the hygroscopic into non-hygroscopic products is effected, and the reaction will have been completed by the time the product from the mixer presents a homogeneous and pulverulent appearance, which requires about 20 to 25 minutes in the case of a charge of 500 kilograms.

In the second stage to complete the process, the product from the mixture is placed in a drier or stove, preferably of the rotary type, heated to about 125° to 130° centigrade in order to expel the whole of the water and the remainder of the freed organic acids.

On issuing from the drier, the product has the appearance of dry earth. Since it contains small granules (which may prove a source of trouble when the fertilizer is applied by means of a mechanical distributor), it is then screened, the small proportion of coarse material being put through a crusher.

The cost of the absorbent material, such as sawdust, which is a cheap waste product, is largely balanced by the considerable saving in time and steam in the process, and by the advantage of avoiding the considerable locking up of capital in purchasing large stocks of superphosphate; in addition to which, a product is obtained better adapted to agricultural needs.

The two successive treatments, conducted at appreciably different temperatures, furnish, under the best conditions as regards yield, a product which remains absolutely and permanently non-hygroscopic, without loss of any of the fertilizing substances contained in the residue employed.

In some particular cases, it is advantageous to still more reduce the proportion of superphosphate in use, but always on the condition that the quality of the product and above all its nonhygroscopicity will not be altered.

I have discovered that the result may be obtained by replacing a portion of the superphosphate by concentrated sulfuric acid; but great care should be taken not to employ an excess of sulfuric acid, so as not to destroy the humic materials contained in the distillery residue. In order to obtain the better results it is advisable to operate as follows:

To the intimate mixture of the distillery residue with the distributing carrier, I add concentrated sulfuric acid in a proportion of 3 or 4 per cent, calculated according to the weight of the distillery residue employed.

Then I introduce the superphosphate in the above cited conditions. The saving in superphosphate thus obtained may attain 25 to 30 per cent.

What I claim is:—

1. Process for the manufacture of a dry and non-hygroscopic fertilizer from alcohol distillery or sugar factory residue, which comprises heating the residue to bring it to the fluid state, mixing it with a distributing carrier, adding to the mixture a quantity of superphosphate whose weight is approximately equal to the weight of the residue taken, treating the mixture in a mixer at a temperature of about 70 degrees C. and placing the resulting product in a drying apparatus heated to about 130 degrees C. whereby the water and the remaining organic acids will be expelled.

2. In a process for the manufacture of a dry and non-hygroscopic fertilizer from alcohol distillery or sugar factory residue and superphosphate, the characteristic feature of effecting the manufacture in two separate stages at different temperatures which comprises heating in the first stage, the said residue to about 70 degrees C. with a quantity of superphosphate whose weight is equal to the weight of the residue taken, and heating in the second stage the resulting product to about 130 degrees C. for the complete expulsion of the water and the remaining organic acids set free during the first stage.

3. Process for the manufacture of a dry and non-hygroscopic fertilizer which comprises heating alcohol distillery or sugar factory residue mixing them with a distributing carrier, adding concentrated sulfuric acid in a proportion of 3 to 4 per cent of the weight of residue, introducing in the mixture a quantity of superphosphate, treating the whole mixture in a mixer at a temperature of about 70 degrees C., and placing the resulting product in a drying apparatus heated to about 130 degrees C.

4. Process for the manufacture of a dry and non-hygroscopic fertilizer from alcohol distillery or sugar factory residue which comprises heating the resdue to bring it to the fluid state, mixing it with a quantity of a distributing carrier amounting to at least 25 per cent of the weight of the residue, adding to the mixture a quantity of superphosphate whose weight is approximately equal to the weight of the residue taken, treating the mixture in a mixer at a temperature of about 70 degrees C., and placing the resulting product in a drying apparatus heated to about 130 degrees C., whereby the water and the remaining organic acids are expelled.

In testimony whereof I have signed this specification.

ZDENKO METZL.